US012566278B2

(12) United States Patent
Zheng et al.

(10) Patent No.: US 12,566,278 B2
(45) Date of Patent: Mar. 3, 2026

(54) METHOD AND APPARATUS FOR SEISMIC DATA INVERSION

(71) Applicant: BP Corporation North America Inc., Houston, TX (US)

(72) Inventors: York Zheng, Surbiton (GB); Matthew Walker, Hersham (GB); Reetam Biswas, Houston, TX (US); Jingfeng Zhang, Katy, TX (US); Ryan Warnick, Austin, TX (US); Pedro Paramo De La Barrera, Richmond (GB); Kevin Wolf, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 354 days.

(21) Appl. No.: 18/156,515

(22) Filed: Jan. 19, 2023

(65) Prior Publication Data

US 2023/0251395 A1      Aug. 10, 2023

Related U.S. Application Data

(60) Provisional application No. 63/308,152, filed on Feb. 9, 2022.

(51) Int. Cl.
*G01V 1/28*          (2006.01)
*G01V 1/34*          (2006.01)

(52) U.S. Cl.
CPC .............. *G01V 1/282* (2013.01); *G01V 1/345* (2013.01)

(58) Field of Classification Search
CPC ................................ G01V 1/282; G01V 1/345
See application file for complete search history.

(56) References Cited

U.S. PATENT DOCUMENTS

| | | | | |
|---|---|---|---|---|
| 4,415,999 A | * | 11/1983 | Moeckel ................ | G01V 1/282 367/56 |
| 2005/0055164 A1 | * | 3/2005 | Neff ....................... | G01V 1/282 702/14 |
| 2017/0115411 A1 | * | 4/2017 | Zhang .................... | G01V 1/282 |

(Continued)

FOREIGN PATENT DOCUMENTS

| | | |
|---|---|---|
| CN | 109765613 A | 5/2019 |
| CN | 113534261 A | 10/2021 |

(Continued)

OTHER PUBLICATIONS

PCT/US2023/060870 International Search Report and Written Opinion dated Apr. 14, 2023 (13 p.).

(Continued)

*Primary Examiner* — Krystine E Breier
(74) *Attorney, Agent, or Firm* — CONLEY ROSE, P.C.

(57)          ABSTRACT

Techniques to allow for increases in the accuracy of the determination of properties of a formation (e.g., a formation's fluid content, porosity, density, etc.) or seismic velocity, shear wave information, etc. are disclosed herein. The techniques include generating initial input data comprising based at least in part on initial seismic data, modeling the initial input data to generate synthetic seismic data based on different combinations of the initial input data, iteratively updating a value of each particle of a set of particles utilizing the synthetic seismic data to generate a final set of particles and outputting the final set of particles as a target distribution.

20 Claims, 6 Drawing Sheets

(56)         References Cited

U.S. PATENT DOCUMENTS

| | | | |
|---|---|---|---|
| 2018/0335530 A1* | 11/2018 | Wu | G01V 1/362 |
| 2019/0302294 A1* | 10/2019 | Ray | G01V 1/345 |
| 2020/0183031 A1* | 6/2020 | Denli | G01V 1/282 |
| 2020/0301035 A1* | 9/2020 | Sun | G01V 1/303 |
| 2021/0063590 A1* | 3/2021 | Cooper | G01V 1/34 |
| 2021/0311223 A1* | 10/2021 | Roy | G01V 1/50 |
| 2022/0221603 A1* | 7/2022 | Kpadonou | G01V 1/303 |
| 2022/0390631 A1* | 12/2022 | Kontakis | G06F 17/14 |

FOREIGN PATENT DOCUMENTS

| | | | | |
|---|---|---|---|---|
| WO | WO-2015124960 A1 * | 8/2015 | | G01V 1/282 |
| WO | WO-2022221179 A1 * | 10/2022 | | G01V 1/303 |
| WO | WO-2024085852 A1 * | 4/2024 | | G01V 20/00 |

OTHER PUBLICATIONS

Liu, Qiang et al, "A Kernelized Stein Discrepancy for Goodness-of-Fit Tests," https://arxiv.org/pdf/1602.03253.pdf, Jul. 1, 2016 (9 p.).

Zhang, Xin et al., "Seismic Tomography Using Variational Inference Methods," Journal of Geophysical Research: Solid Earth, Nov. 2019 (25 p.).

Liu, Qiang, "Stein Variational Gradient Descent as Gradient Flow," 31st Conference on Neural Information Processing Systems (NIPS 2017), Long Beach, CA, USA (9 p.).

Liu, Qiang et al., "Stein Variational Gradient Descent: A General Purpose Bayesian Inference Algorithm," 30th Conference on Neural Information Processing Systems (NIPS 2016), Barcelona, Spain (9 p.).

Nawaz, Muhammad et al., "Variational Bayesian Inversion of Seismic Attributes Jointly for Geologic Facies and Petrophysical Rock Properties," Geophysics, vol. 85, No. 4, Jul.-Aug. 2020, pp. MR213-233 (21 p.).

Zhang, Xin et al., "Variational Full-Waveform Inversion," Geophysical Journal International, vol. 222, pp. 406-411, Apr. 2020 (6 p.).

\* cited by examiner

10

12

Locate hydrocarbon deposits based on analyzed seismic data

14

Drill into subsurface regions based on location

16

Produce hydrocarbons

18

Transport produced hydrocarbons

20

Refine produced hydrocarbons

METHOD AND APPARATUS FOR SEISMIC DATA INVERSION

CROSS REFERENCE TO RELATED APPLICATIONS

This application is a non-provisional application claiming priority to U.S. provisional patent application No. 63/308,152 filed Feb. 9, 2022, and entitled "Method and Apparatus for Seismic Data Inversion," which is hereby incorporated herein by reference in its entirety for all purposes.

BACKGROUND

The present disclosure relates generally to implementing seismic inversion.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits. Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Analysis of seismic data may provide valuable information, such as the location and/or change of hydrocarbon deposits within a subsurface region of the Earth. The present disclosure generally discusses techniques that may be used to improve interpretation of seismic data via the use of amplitude variation with offset (AVO) inversion (or amplitude versus offset inversion). More particularly, present techniques allow for improvements to a probabilistic (e.g., Bayesian) approach to AVO inversion to allow for increases in accuracy of the determination of properties of a formation (e.g., a formation's fluid content, porosity, density, etc.) or seismic wave speeds, etc.

In some embodiments, probabilistic inversion is performed on seismic data for the purpose of reservoir characterization. For example, the probabilistic inversion is used to estimate subsurface elastic parameters (e.g., p-wave and s-wave velocities, density, etc.) from processed seismic data (e.g., angle gathers, stacks, etc.). The resulting probabilistic volumes (which may be 3D volumes) that are generated include improved accuracies over volumes and can be used in a multitude of manners. For example, the probabilistic volumes can be used to improve direct geological interpretation. The probabilistic volumes can also be used to derive seismic volumes, such as band-limited reflectivity and elastic impedance, which are less noisy than conventionally processed data. The probabilistic volumes can additionally be used in computing elastic moduli and inferring other petro-physical properties, such as fluid and lithology types. In this manner, the specific techniques described herein lead to generation of probabilistic volumes that have improved accuracy without corresponding alterations to the complexity of the hardware of the computing system generating the probabilistic volumes.

Figure 1:
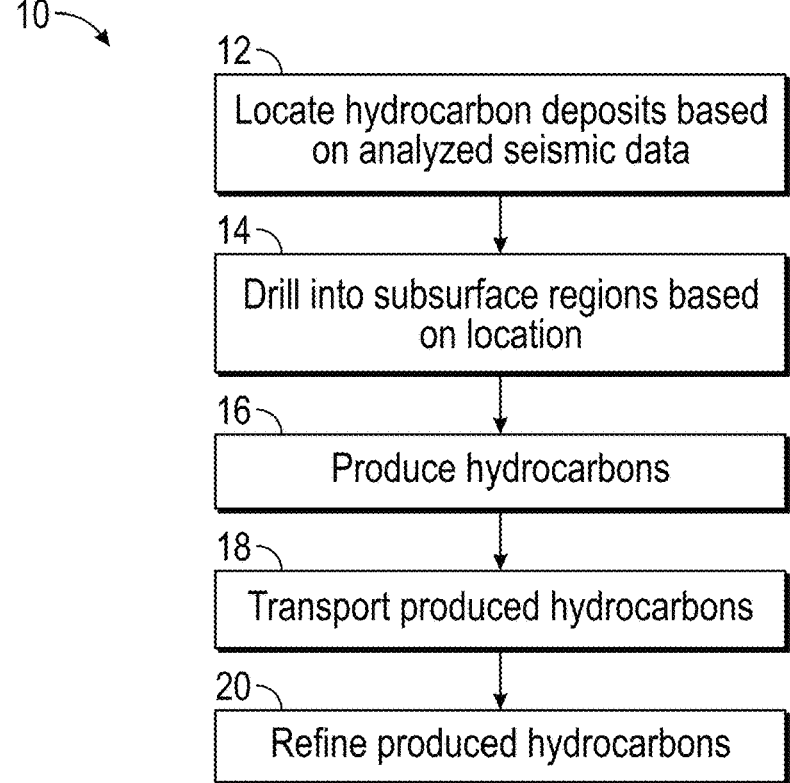
FIG. 1 illustrates a flow chart of various processes that may be performed based on analysis of seismic data acquired via a seismic survey system.
Figure 2:
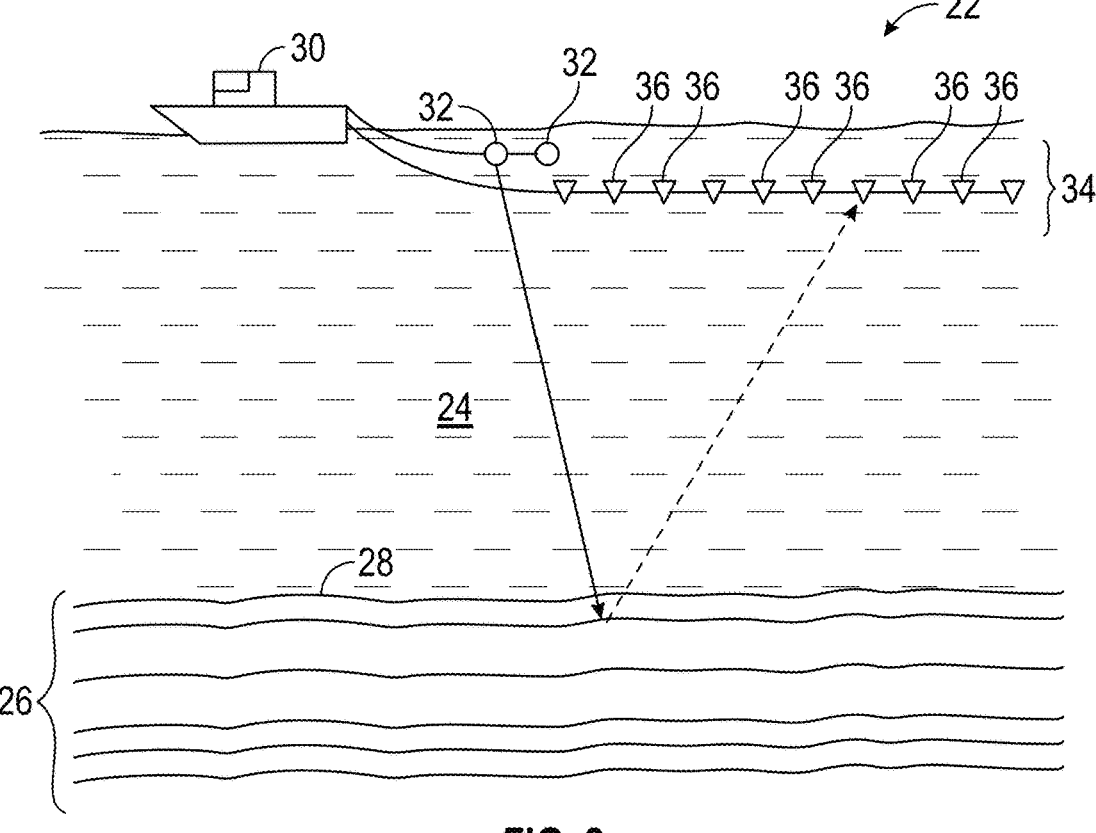
FIG. 2 illustrates a marine survey system in a marine environment.
Figure 3:
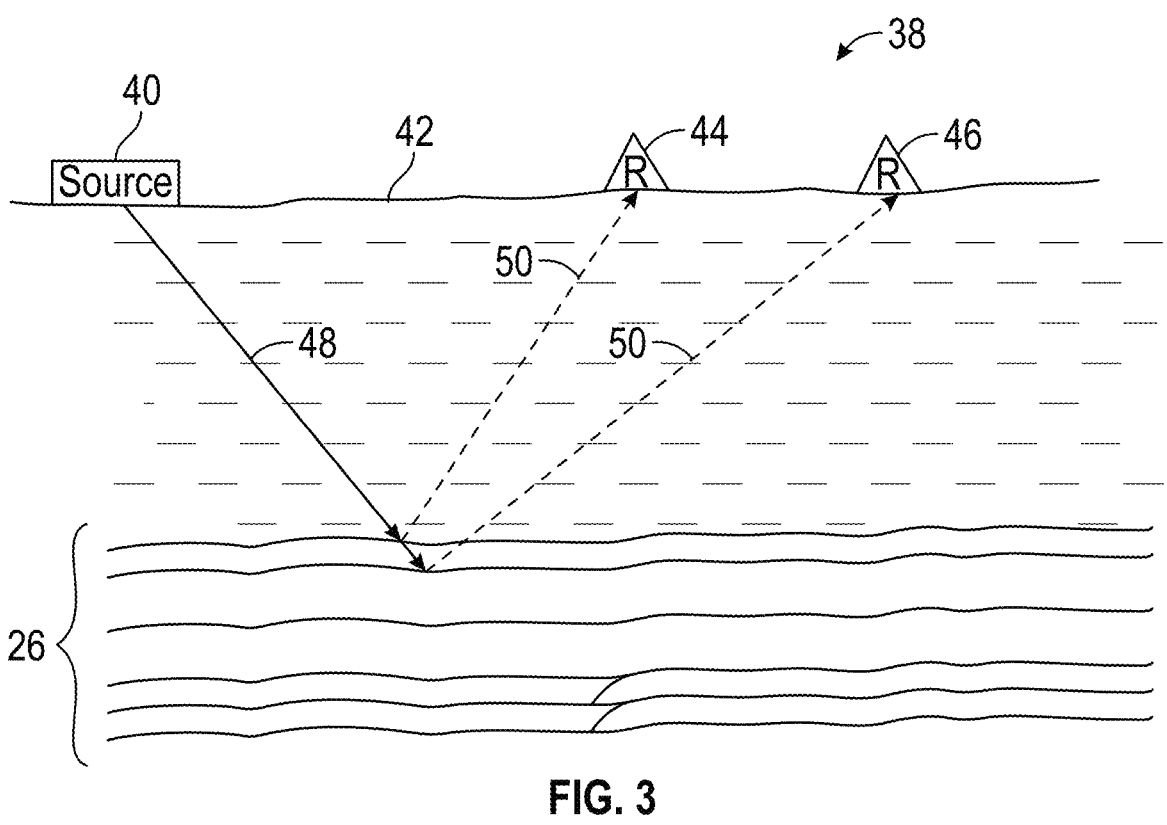
FIG. 3 illustrates a land survey system in a land environment.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired may be analyzed to generate a map or profile that illustrates various geological formations within the subsurface region. Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the foregoing in mind, FIG. 2 is a schematic diagram of a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, one or more seismic sources 32, a (seismic) streamer 34, one or more (seismic) receivers 36, and/or other equipment that may assist in acquiring seismic images representative of geological formations within a subsurface region 26 of the Earth. The vessel 30 may tow the seismic source(s) 32 (e.g., an air gun array) that may produce energy, such as sound waves (e.g., seismic waveforms), that is directed at a sea-floor 28. The vessel 30 may also tow the streamer 34 having a receiver 36 (e.g., hydrophones) that may acquire seismic waveforms that represent the energy output by the seismic source(s) 32 subsequent to being reflected off of various geological formations (e.g., salt domes, faults, folds, etc.) within the subsurface region 26. Additionally, although the description of the marine survey system 22 is described with one seismic source 32 (represented in FIG. 2 as an air gun array) and one receiver 36 (represented in FIG. 2 as a set of hydrophones), it should be noted that the marine survey system 22 may include multiple seismic sources 32 and multiple receivers 36. In the same manner, although the above descriptions of the marine survey system 22 is described with one seismic streamer 34, it should be noted that the marine survey system 22 may include multiple streamers similar to streamer 34. In addition, additional vessels 30 may include additional seismic source(s) 32, streamer(s) 34, and the like to perform the operations of the marine survey system 22.

FIG. 3 is a block diagram of a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include multiple land-based seismic sources 40 and one or more land-based receivers 44 and 46. Indeed, for discussion purposes, the land survey system 38 includes a land-based seismic source 40 and two land-based receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
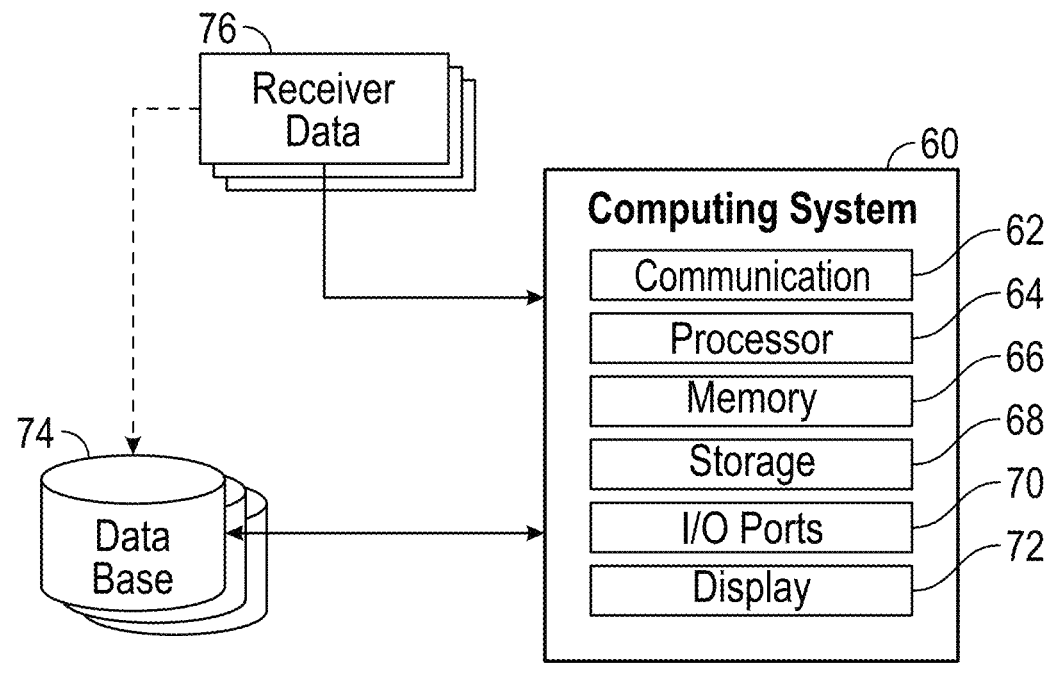
FIG. 4 illustrates a computing system that may perform operations described herein based on data acquired via the marine survey system of FIG. 2 and/or the land survey system of FIG. 3.

Regardless of how the seismic data is acquired, a computing system (e.g., for use in conjunction with block 12 of FIG. 1) may analyze the seismic waveforms acquired by the receivers 36, 44, 46 to determine seismic information regarding the geological structure, the location and property of hydrocarbon deposits, and the like within the subsurface region 26. FIG. 4 is a block diagram of an example of such a computing system 60 that may perform various data analysis operations to analyze the seismic data acquired by the receivers 36, 44, 46 to determine the structure and/or predict seismic properties of the geological formations within the subsurface region 26.

Referring now to FIG. 4, the computing system 60 may include a communication component 62, a processor 64, memory 66, storage 68, input/output (I/O) ports 70, and a display 72. In some embodiments, the computing system 60 may omit one or more of the display 72, the communication component 62, and/or the input/output (I/O) ports 70. The communication component 62 may be a wireless or wired communication component that may facilitate communication between the receivers 36, 44, 46, one or more databases 74, other computing devices, and/or other communication capable devices. In one embodiment, the computing system 60 may receive receiver data 76 (e.g., seismic data, seismograms, etc.) via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

With one or more embodiments, processor 64 can instantiate or operate in conjunction with one or more seismic inversion techniques. With another embodiment, the computing system 60 can be implemented by using neural networks. The one or more neural networks can be software-implemented or hardware-implemented. One or more of the neural networks can be a convolutional neural network.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, predictions of seismic properties associated with one or more wells in the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloudcomputing system, or the like to distribute processes to be performed across multiple computing systems 60. In this case, each computing system 60 operating as part of a super computer may not include each component listed as part of the computing system 60. For example, each computing system 60 may not include the display 72 since multiple displays 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the seismic sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

One technique envisioned for seismic analysis is amplitude variation with offset (AVO) inversion (or amplitude versus offset inversion). In general, variations in seismic reflective amplitudes accompany differences in characteristics (e.g., lithology, fluid content, etc.) in formations above and below a given reflector (e.g., a boundary region between two layers of the Earth having distinct properties). In one embodiment, AVO inversion can be performed using a deterministic approach whereby a single outcome (e.g., a single volume) is generated and/or output. Using this deterministic approach can increase the rate at which reservoir characterization is accomplished. However, as the result is only a single output, it may have reduced accuracy and/or reliability and any associated uncertainty is not captured.

Thus, in another embodiment, AVO inversion can be performed using a probabilistic approach (e.g., Bayesian approach) whereby the outcome is represented by a distribution of outcomes (e.g., a set of possible volumes) that is generated and/or output. The distribution can, in some embodiments, also indicate the likelihood of each possible volume in the distribution. Thus, the probabilistic approach can generate a posterior distribution that can be utilized to access uncertainties.

In some embodiments, Bayesian inference is undertaken (e.g., Bayesian inference applied to the seismic data) using a probabilistic approach utilizing a sampling method, such as Markov Chain Monte Carlo (MCMC), to draw samples from the posterior distribution. However, this technique can be computationally expensive, requiring the computing system 60 to have robust capability in the processor 64 and/or require lengthy periods of time to generate results. Accordingly, in another embodiment, the Bayesian inference is instead performed as an optimization process. This allows for efficient approximation of the posterior distribution of subsurface elastic parameters even in cases where, for example, the computing system 60 has a less robust processor 64 and/or initializes less lengthy periods of time to generate results if the computing system 60 were to instead apply a sampling method.

Figure 5:
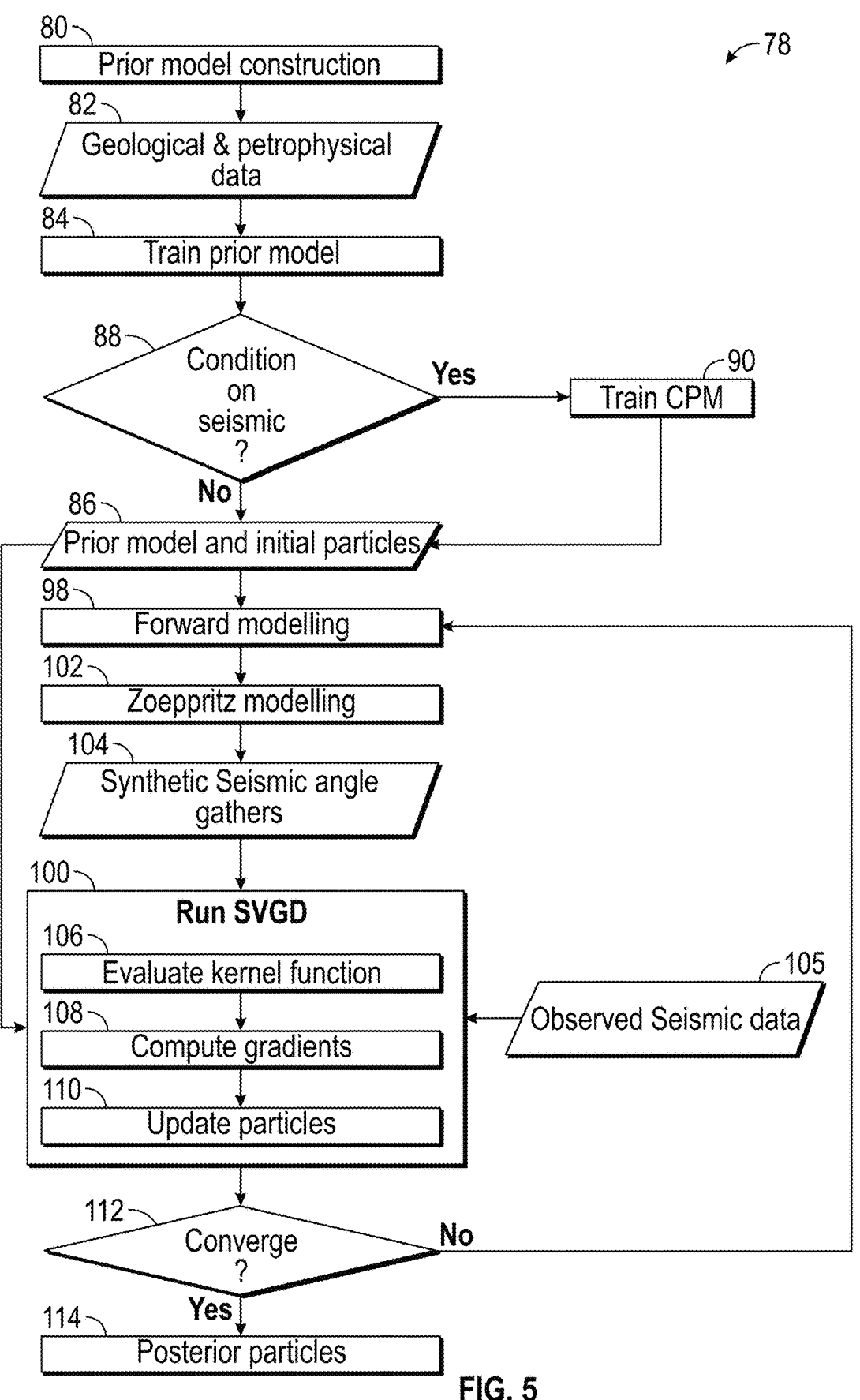
FIG. 5 illustrates a flow diagram of an operation to carry out Bayesian inversion on processed seismic data.

FIG. 5 illustrates one example of a technique, illustrated as a flow chart 78, to carry out Bayesian inversion on processed seismic data in order to estimate subsurface elastic parameters and their associated uncertainties. This process can be performed on the computing system 60 to analyze acquired seismic data (e.g., performed as code stored on a tangible and non-transitory machine readable medium, such as the memory 66 and/or the storage 68, that when in operation causes the processor 64 to perform one or more of the steps of the flow chart 78 as performance of the technique). Generally, flow chart 78 includes process 80, which represents prior model construction. This prior model can be a statistical model (e.g., encoded or presented in a mathematical function, representation, or parameterization). Process 80, as illustrated, includes various sub-processes, which are illustrated in flow chart as step 82, step 84, step 86, step 88, and step 90. In step 82 geological and petrophysical data (i.e., seismic data) is received by computing system 60. Examples of this data may be well logs, geological descriptions (rock types, etc), and geophysical data. In step 84, the computing system 60 operates to train prior models.

Probability distributions utilized in conjunction with the technique illustrated in FIG. 5 can be represented by a set of earth models, parameterized in terms of P-wave speed (Vp), S-wave speed (Vs), and density (e.g., density characteristics of a rock formation or type), and/or other physical representations of the subsurface which may be referred to collectively as particles. In some embodiments, the training of the prior model in step 84 includes the use of Gaussian, uniform, and/or Gaussian mixture models to generate statistical models as the prior model (or portions thereof).

In some embodiments, step 88 determines whether initial particles are to be conditioned on seismic data and, if so, step 90 can be undertaken. Step 90 involves training a conditioned prior model (CPM). That is, in some embodiments, there is an additional option to condition the prior model on input seismic data on a sample-by-sample basis. This CPM in step 90 can be used to generate initial particles (e.g., different initial particles) which are distributed according to an approximation of the target posterior distribution, thus improving convergence of the optimization as, for example, an enhanced Gaussian mixture model. Step 90 may be undertaken based upon whether conditioning of the seismic data is selected in step 88 which, as described above, can be selected based on the desired results and/or efficiency, complexity, time, etc. to be undertaken with respect to process 80. In other embodiments, steps 88 and 90 can be removed from the process 80.

The output of process 80 may be the trained prior model and initial particles as illustrated in step 86, which may (in some embodiments) occur directly subsequent to step 84 or subsequent to step 88 and step 90. The prior model of step 86 refers to the trained prior model discussed above. The set of initial particles can be derived, e.g., sampled from the statistical prior model, when step 86 directly follows step 84. Alternatively, the initial particles can be generated subsequent to steps 88 and 90 in which the prior model is conditioned with seismic data to arrive at the CPM. This CPM of step 90 can be sampled to generate initial particles for step 86.

Figure 6:
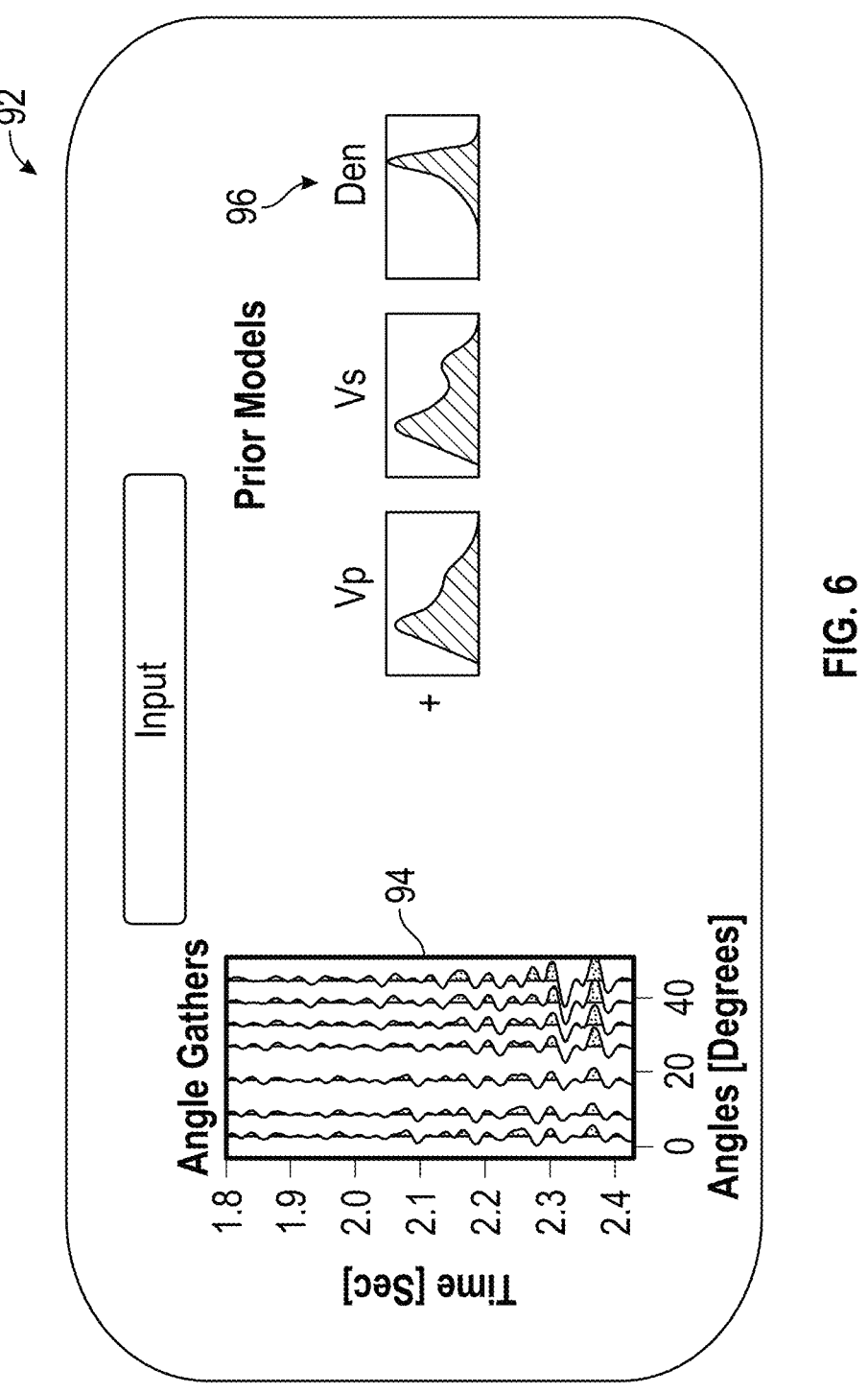
FIG. 6 illustrates a graphical representation of an example of input data used in conjunction with the flow diagram of FIG. 5.

The input for the CPM may be represented in FIG. 6, which illustrates a graphical representation 92 of the seismic data 94 (represented in FIG. 6 as angle gathers) that the prior model(s) 96 are conditioned with in connection with step 90. The prior model(s) 96 are representations of distributions from which a sample can be taken to generate an initial particle for step 86. Likewise, the seismic data 94 can be, for example, post-stack data or angle gathers that have been migrated.

Returning to FIG. 5, flow chart 78 additionally includes process 98, which represents forward modeling, and process 100, which represents the computing system 60 running an efficient particle-based inference algorithm known as Stein Variational Gradient Descent (SVGD). To perform Bayesian optimization (e.g., a Bayesian inversion) with SVGD, probability distributions are represented by sets of particles instead of probability density functions. These particles are separate realizations of the 1D elastic earth models consisting of P-wave velocity, S-wave velocity and density profiles. In SVGD, various kernels (e.g., scalar-valued kernels or more general matrix-valued kernels) can be tested for best performance.

Process 98 includes forward modeling that is performed to generate synthetic seismograms for each particle. That is, process 98 includes receipt of a set of particles from step 86. The computing system 60, in conjunction with process 98, operates to generate synthetic seismic data by solving the full Zoeppritz equations in step 102 to obtain the desired synthetic seismic data as an output in step 104. Thus, process 98 operates to generate synthetic seismic data based upon the initial particles described above and received from step

86, i.e., to generate synthetic seismic data based upon different combinations of Vp, Vs, and density. In this manner, synthetic seismic angle gathers are generated in step 104 based on the process undertaken in step 102. These gathers are provided to the process 100. Additionally, observed seismic data is be provided to the process 100 as part of step 105.

As part of process 100, at each iteration, prior probabilities are combined with the likelihoods of each particle to form the target density and its gradient is weighted by a kernel function to provide the update directions for each particle. This process is then repeated until it arrives at a final set of particles that closely approximates the posterior distribution. The likelihood is computed assuming a statistical model of the seismic noise. The gradient of likelihood is combined with that of the prior to form gradient scores evaluated at each particle, where the gradient scores are then scaled by a kernel function. The computed gradients are then used to update all the particles simultaneously in each iteration. After a predetermined number of iterations and/or when a pre-determined convergence criterion is met, a final set of particles that represents the target (posterior) distribution is generated. As discussed below, steps 106, 108, and 110 can be processes undertaken as part of process 100.

Step 106 of process 100 includes evaluation of the kernel function that is used to scale the above described gradient scores. In step 108, the gradient of likelihood is combined with that of the prior model from step 86 to form gradient scores evaluated at each particle, where the gradient scores are then scaled by the kernel function from step 106. The kernel function is a mathematical measure of similarity between the particles, but in the context of the algorithm it enforces diversity in the posterior. The computed gradients of step 108 are then used to update all the particles simultaneously in each iteration in step 110. At step 112, a determination on whether convergence has occurred is undertaken. This determination may include a predetermined number of iterations of the above described process being undertaken and/or determination of whether a pre-determined convergence criterion is met. If the determination is negative with respect to the convergence in step 112, process 98 is undertaken with the revised values for the particles. If instead, in step 112, convergence is determined to have occurred, the final set of particles that represents the target (posterior) distribution is generated in step 114.

Figure 7:
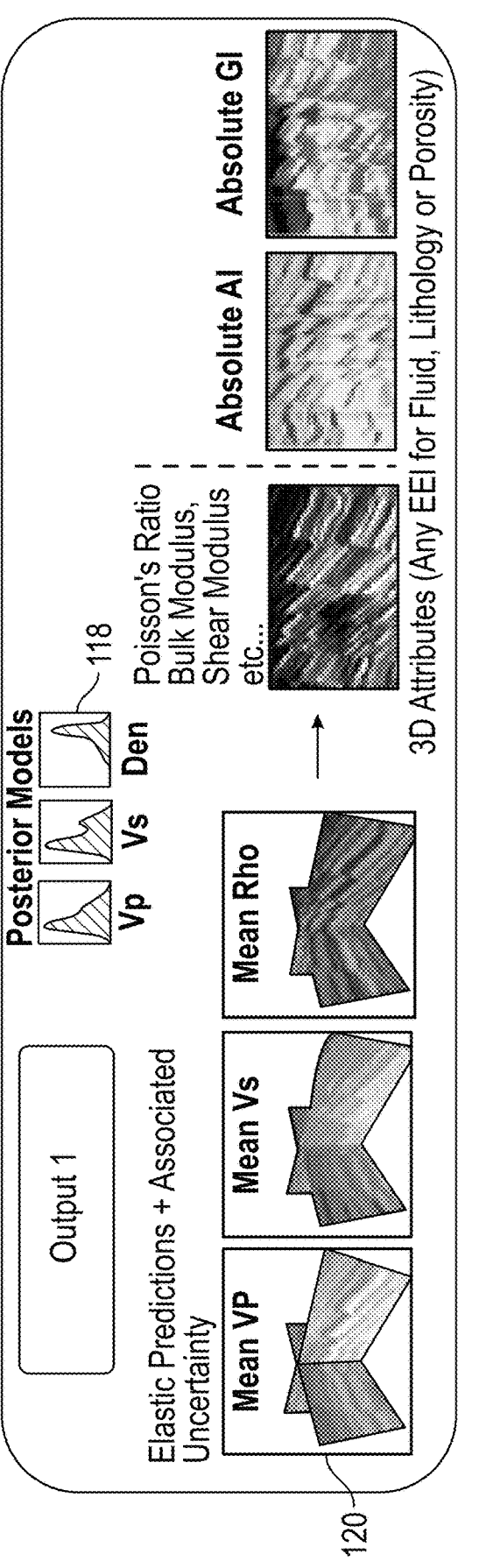
FIG. 7 illustrates a graphical representation of an example of an output of the flow diagram of FIG. 5.

FIG. 7 illustrates a graphical representation 116 of estimates of the posterior distribution 118 as well as a mean of the posterior for a volume 120 in a 3D volume. Accordingly, FIG. 7 represents an output generated using the AVO inversion performed using a probabilistic approach (e.g., Bayesian approach) as discussed above with respect to FIG. 5. The final set of particles generated by the technique of FIG. 5 can be used to estimate subsurface elastic parameters (p-wave and s-wave velocities, and density) from processed seismic data (angle gathers or stacks). The resulting probabilistic volumes (e.g., 3D volumes) can be used, for example, in direct geological interpretation, deriving de-noised seismic data, such as reflectivity and elastic impedance volumes, computing elastic moduli and inferring other petrophysical properties, such as fluid and lithology types, or in other desired manners.

The above described technique to carry out Bayesian inversion on processed seismic data in order to estimate subsurface elastic parameters and their associated uncertainties provides benefits that include a single workflow for inverting a range of subsurface properties and that provides accurate subsurface predictions for different geological settings. Additionally, the technique provides an efficient algorithm that can search through a large prior model space and can handle multi-model distributions while minimizing the number of assumptions in the underlying physics. The technique additionally allows for flexibility to select a prior model appropriate to the end use and that is adaptable to different geological settings (e.g., exploration vs. development, environment, complex or simple geologies). Likewise, the technique requires minimal user interaction and operates without need for interpretation input on items such as horizons, contacts, etc. Furthermore, a range of solutions are calibrated with prior information and seismic data quality in a Bayesian framework. In some embodiments, this provides the use of SVGD results to generate cleaner impedances and elastic moduli.

Figure 8:
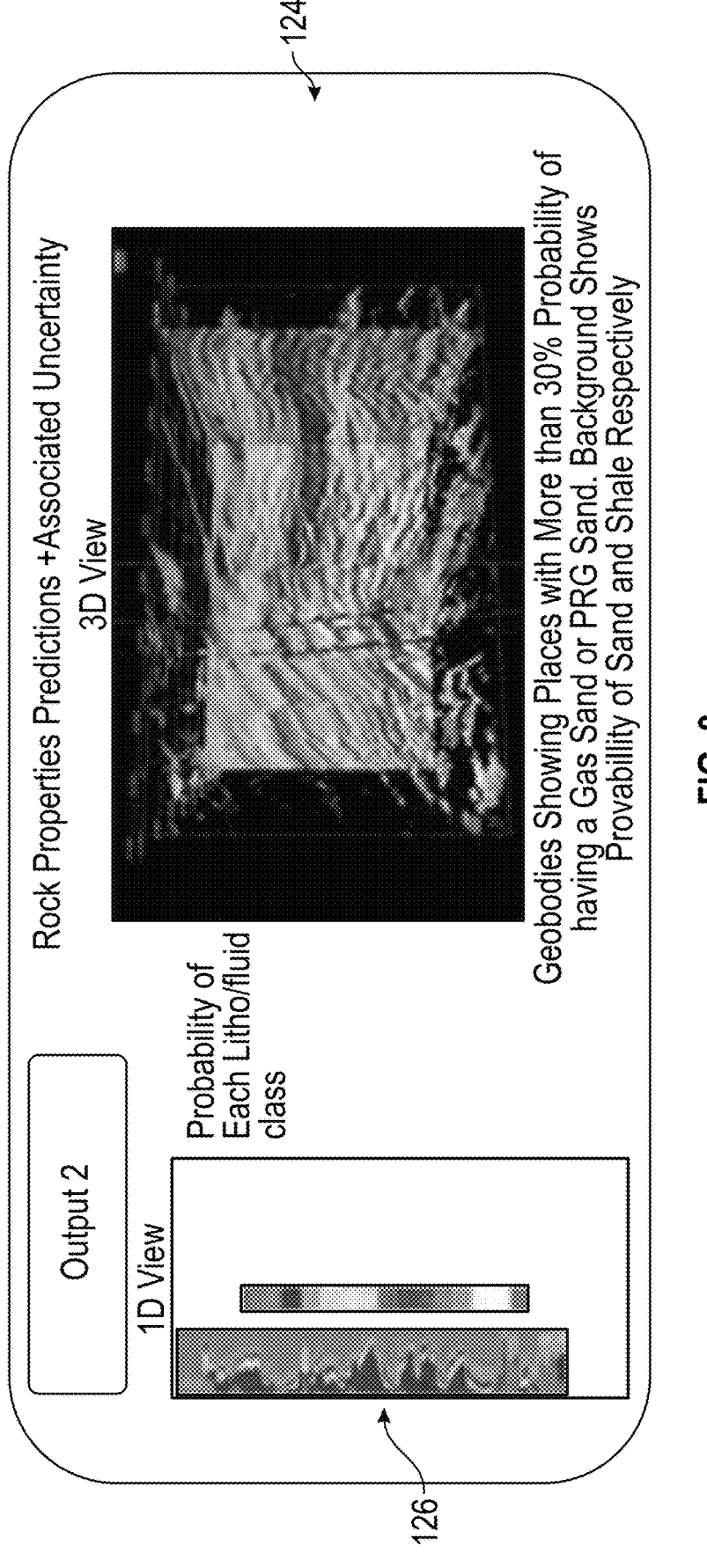
FIG. 8 illustrates a graphical representation including rock property predictions with associated uncertainties generated from the final set of particles generated using the technique illustrated with respect to FIG. 5.

It should also be noted that the output generated in step 114 can, in some embodiments, operate as an additional input to additional lithology and fluid predictions. As illustrated in FIG. 8, a graphical representation 122 including rock property predictions with associated uncertainties 124 is illustrated as a 3D view. An additional view of the probability of each lithology and fluid class 126 is presented in FIG. 8. These representations illustrate the additional lithology and fluid predictions that can be generated based upon the results of the technique outlined with respect to FIG. 5. That is, the elastic predictions of step 114 can be utilized in the generation of probabilities of different lithio/fluid classes (e.g., the probabilities of having different rock types, different fluids, different porosities in the rocks, etc.).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

generating initial input data based at least in part on initial seismic data;

modeling the initial input data to generate synthetic seismic data based on different combinations of the initial input data, wherein the initial input data comprises a set of particles, wherein each particle comprises a separate parameterized model of the subsurface formation representing a different combination of P-wave speed (Vp), S-wave speed (Vs), or density characteristics of the subsurface formation;

iteratively updating each particle of the set of particles utilizing the synthetic seismic data to generate a final set of particles; and outputting the final set of particles as a target distribution of parameterized models of the subsurface formation.

2. The method of claim 1, wherein generating the initial input data additionally comprises generating an initial value of one or more of the P-wave speed (Vp), the S-wave speed (Vs), and the density characteristics for each particle of the set of particles as a portion of the initial input data based on at least one of geological, petrophysical, and seismic data.

3. The method of claim 1, wherein modeling the initial input data comprises solving Zoeppritz equations using the initial input data to generate the synthetic seismic data.

4. The method of claim 3, wherein modeling the initial input data comprises generating a synthetic seismic angle gather subsequent to solving the Zoeppritz equations.

5. The method of claim 1, comprising utilizing a Stein Variational Gradient Descent (SVGD) as a variational inference algorithm during iteratively updating each particle of the set of particles utilizing the synthetic seismic data, observed seismic data, and a prior model generated as a portion of the initial input data.

6. The method of claim 5, comprising forming a gradient score for each particle of the set of particles as part of the SVGD.

7. The method of claim 6, comprising scaling a gradient score of each particle of the set of particles by a kernel function as part of the SVGD to provide an updated direction for each particle of the set of particles.

8. The method of claim 7, wherein iteratively updating each particle of the set of particles utilizing the synthetic seismic data to generate the final set of particles comprises forwarding modeling each particle of the set of particles subsequent to providing an updated direction for each particle of the set of particles and applying SVGD thereafter on each particle of the set of particles.

9. The method of claim 1, wherein each particle of the set of particles corresponds to at least one subsurface elastic parameter.

10. The method of claim 1, comprising utilizing the final set of particles as the target distribution as an input to determine at least one probability a lithology class or a fluid class.

11. A tangible and non-transitory machine readable medium, comprising instructions to cause a processor to:

generate initial input data comprising based on initial seismic data;

model the initial input data to generate synthetic seismic data based on different combinations of the initial input data, wherein the initial input data comprises a set of particles, wherein each particle comprises a separate parameterized model of the subsurface formation representing a different combination of P-wave speed (Vp), S-wave speed (Vs), or density characteristics of the subsurface formation;

iteratively update each particle of the set of particles utilizing the synthetic seismic data to generate a final set of particles; and output the final set of particles as a target distribution of parameterized models of the subsurface formation.

12. The tangible and non-transitory machine readable medium of claim 11, comprising instructions to cause the processor to generate the initial input data by generating an initial value of one or more of the P-wave speed (Vp), the S-wave speed (Vs), and the density characteristics for each particle of the set of particles as a portion of the initial input data based on at least one of geological, petrophysical, and seismic data.

13. The tangible and non-transitory machine readable medium of claim 11, comprising instructions to cause the processor to model the initial input data by solving Zoeppritz equations using the initial input data to generate the synthetic seismic data.

14. The tangible and non-transitory machine readable medium of claim 13, comprising instructions to cause the processor to generate a synthetic seismic angle gather subsequent to solving the Zoeppritz equations.

15. The tangible and non-transitory machine readable medium of claim 11, comprising instructions to cause the processor to utilize a Stein Variational Gradient Descent (SVGD) as a variational inference algorithm during iteratively updating each particle of the set of particles utilizing the synthetic seismic data, observed seismic data, and a prior model generated as a portion of the initial input data.

16. The tangible and non-transitory machine readable medium of claim 15, comprising instructions to cause the processor to form a gradient score for each particle of the set of particles as part of the SVGD.

17. The tangible and non-transitory machine readable medium of claim 16, comprising instructions to cause the processor to scale a gradient score of each particle of the set of particles by a kernel function as part of the SVGD to provide an updated direction for each particle of the set of particles.

18. The tangible and non-transitory machine readable medium of claim 17, comprising instructions to cause the processor to iteratively update each particle of the set of particles utilizing the synthetic seismic data to generate the final set of particles by forwarding modeling each particle of the set of particles subsequent to providing an updated direction for each particle of the set of particles and applying SVGD thereafter on each particle of the set of particles.

19. The tangible and non-transitory machine readable medium of claim 11, wherein each particle of the set of particles corresponds to at least one subsurface elastic parameter.

20. The tangible and non-transitory machine readable medium of claim 11, comprising instructions to cause the processor to utilize the final set of particles as the target distribution as an input to determine at least one probability a lithography class or a fluid class.

\* \* \* \* \*